US008393440B2

(12) United States Patent
Baumgartner et al.

(10) Patent No.: US 8,393,440 B2
(45) Date of Patent: Mar. 12, 2013

(54) BRAKE DEVICE HAVING AN ELASTIC ENERGY ACCUMULATOR

(75) Inventors: Johann Baumgartner, Moosburg (DE); Aleksandar Pericevic, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 684 days.

(21) Appl. No.: 12/296,023

(22) PCT Filed: Apr. 5, 2007

(86) PCT No.: PCT/EP2007/003094
§ 371 (c)(1),
(2), (4) Date: Mar. 19, 2009

(87) PCT Pub. No.: WO2007/115788
PCT Pub. Date: Oct. 18, 2007

(65) Prior Publication Data
US 2010/0288588 A1 Nov. 18, 2010

(30) Foreign Application Priority Data

Apr. 6, 2006 (DE) .......................... 10 2006 016 316
Oct. 27, 2006 (DE) .......................... 10 2006 050 804

(51) Int. Cl.
*F16D 55/02* (2006.01)
*F16D 55/16* (2006.01)
*F16D 55/46* (2006.01)
(52) U.S. Cl. ...................... 188/72.9; 188/71.8; 188/72.2
(58) Field of Classification Search .................. 188/71.7, 188/71.8, 72.1, 72.2, 72.6, 72.7, 72.9, 166
See application file for complete search history.

(56) References Cited

U.S. PATENT DOCUMENTS

| 5,501,305 | A | * | 3/1996 | Stalmeir et al. | ............... | 188/167 |
| 6,662,908 | B2 | * | 12/2003 | Gradert et al. | ............... | 188/72.9 |
| 6,722,477 | B1 | * | 4/2004 | Wolfsteiner et al. | ......... | 188/72.9 |
| 7,413,061 | B2 | * | 8/2008 | Wagner et al. | ............... | 188/72.9 |
| 2005/0029858 | A1 | * | 2/2005 | Forster et al. | .................... | 303/20 |

FOREIGN PATENT DOCUMENTS

| DE | 43 30 440 A1 | 3/1995 |
| DE | 101 40 075 A1 | 2/2003 |
| DE | 101 61 500 A1 | 6/2003 |
| EP | 0 094 262 A1 | 11/1983 |
| FR | 2 548 309 A1 | 1/1985 |
| FR | 2 626 049 A1 | 7/1989 |
| WO | WO 01/44677 A1 | 6/2001 |
| WO | WO 03/016745 A2 | 2/2003 |

OTHER PUBLICATIONS

International Search Report dated Aug. 6, 2007 with English translation (Ten (10) pages).

* cited by examiner

*Primary Examiner* — David Dunn
*Assistant Examiner* — Philip Gabler
(74) *Attorney, Agent, or Firm* — Crowell & Moring LLP

(57) ABSTRACT

Disclosed is a brake device, particularly a disc brake, comprising a caliper, brake drum, or similar, and energy accumulator, especially an accumulator spring. The energy accumulator rests on the caliper or similar while being supported on an abutment by means of a lever arm. A mechanism for transmitting resilient forces between the energy accumulator embodying one spring element is created with the aid of a lever arm via the abutment. The brake device is characterized in that the lever arms can take at least two or more different angular positions relative to each other in relation to the abutment.

33 Claims, 16 Drawing Sheets

BRAKE DEVICE HAVING AN ELASTIC ENERGY ACCUMULATOR

BACKGROUND AND SUMMARY OF THE INVENTION

The invention relates to a brake device, in particular to a disc or drum brake, having a brake caliper or a brake drum and an energy accumulator, in particular an accumulator spring. The energy accumulator is supported, on the one hand, on the brake caliper or the like, and, on the other hand, by way of a lever arm on an abutment.

A wide and diverse variety of brake devices are known from the prior art, such as, also, vehicle brakes having an elastic energy accumulator, typically a spring accumulator, in which an equilibrium between the energy accumulator and the brake mechanism to be spread open is maintained by adapting the force step-up ratio in the range of possible tension forces of the brake.

Solutions of this type have been adopted, for example, in WO 01/44 677 A1 and WO 03/016745 A2.

A basic illustration of such prior art is shown in FIG. 1.

According to this design, in each position of a displaceable abutment "A", a stable equilibrium state between the energy accumulator and brake caliper is established by relaxing or tensioning the spring elasticities of the energy accumulator (lever arm $l_1$) and brake caliper (lever arm $l_2$) according to the ratio of the lever arm lengths $l_1$ and $l_2$ and of the spring rigidities $c_1$ and $c_2$.

By displacing the position of the abutment "A", the tension force of the brake can thus be varied within given limits.

What the solutions of the prior art have in common is that an adjustably positioned abutment is required, in each case, in order to variably set the equilibrium state.

The adjusting operation in this case entails an appreciable outlay in terms of energy, since, depending on the compression state of the energy-emitting or energy-absorbing elements, forces directed opposite to the adjusting movement occur on the adjusting mechanism of the abutment:

$$F_A = (F_1 + F_2) \cdot \sin \phi$$

There are, in addition, the frictional losses occurring in the adjusting mechanism (see the basic diagram of FIG. 2).

A further problem of the known solutions is that no measures are provided for adapting the force step-up ratios to the spring rigidities of the brake mechanism which are variable due to wear.

Particularly in disc brakes, however, the overall rigidity of the brake mechanism consisting of the brake caliper, the brake pads and the brake disc is influenced substantially by the relatively soft brake lining material.

Since, during operation, the lining material is worn away from a maximum thickness (when new) to virtually zero, a high wear-dependent variation in the overall rigidity of this arrangement occurs.

What is applicable is:

$$\frac{1}{c_{overall}} = \frac{1}{c_{Caliper}} + \frac{1}{c_{Lining}} + \frac{1}{c_{Disk}}$$

The amount of coverall may vary, for example, in a ratio of $$\frac{c_{overall \cdot max}}{c_{overall \cdot min}} = 2$$

as a result of the wear-dependent compressibility of the brake pads.

The result of the pronounced spread in the $C_{overall}$ value is that, in the extreme states of "lining new" and/or "lining worn", energy compensation between the energy accumulator and the brake caliper becomes out of tune such that only a small fraction of the possible energy saving is utilized, that is to say, a considerable power consumption of the brake is required, thus making it necessary to have a correspondingly large dimensioning of the electric drive motor and of the following drive elements.

Against this background, the object of the invention is to develop further a brake device such that the problems of the adjustable abutment and, preferably, also the above-described problem of the influence of the lining compressibility, variable as a function of wear, on the power requirement of the brake are in any event essentially eliminated.

According to the invention, a brake device is provided, in particular a disc brake, having a brake caliper and an energy accumulator. The energy accumulator, in particular, an accumulator spring, is supported, on the one hand, on the caliper and, on the other hand, by way of a lever arm on an abutment. A mechanism for transmitting resilient forces between the energy accumulator embodying one spring element and the caliper embodying another spring element is formed with another lever arm via the abutment. The lever arms can take at least two or more different angular positions relative to each other in relation to the abutment.

Accordingly, the lever arms ($l_1$ and $l_2$) can assume at least two or more different angular positions in relation to one another with respect to the abutment "A". By virtue of this measure, the brake device is provided with a force step-up mechanism which, in the case of a suitable arrangement of the force action directions of the accumulator spring and brake caliper tension force in relation to the lever arms acted upon by these forces, and also of the configuration of the lever arm lengths and rigidities of the two spring systems in relation to one another, is automatically in an equilibrium state in any adjustment position of the lever and, therefore, in the case of any tension force of the brake which is to be set.

The simple design of the lever system, in conjunction with its special properties, makes it possible in this case to adapt the step-up characteristic to the caliper rigidity variable as a function of wear.

This is implemented preferably in that the lever arm generating the tension force is held variably in its angular position in relation to the force direction of the tension force.

Thus, in turn, preferably an angular position of the other lever leading with respect to the angular position of one lever arm is set. This lead angle is increased proportionally to the brake lining wear preferably by the action of the wear adjustment system present in the brake. In this way, the increasing rigidity of the brake caliper is compensated by a continuous increase in the step-up ratio and an adapted progression of the step-up.

The invention also provides a disc brake having a caliper which straddles a brake disc, for example, in a frame-like manner, there being arranged as an energy accumulator in the caliper an accumulator spring, which is supported with one of its ends via a support bearing on the inside of the caliper or of a spring pot in the region facing away from the brake disc, the end which faces the brake disc or the front region of the accumulator spring being articulated at a joint as an articulation point, preferably on a brake lever pivotable by an adjusting mechanism. This type of construction makes it possible to have a structurally perfectly cost-effective and simple implementation of the brake device according to the invention as a disc brake.

BRIEF DESCRIPTION OF THE DRAWINGS

The invention will be described in more detail below by way of exemplary embodiments, with reference to the drawings.

DETAILED DESCRIPTION OF THE DRAWINGS

The basic set-up of a brake device according to the invention will be explained in more detail first with reference to FIG. 3.

Figure 1:
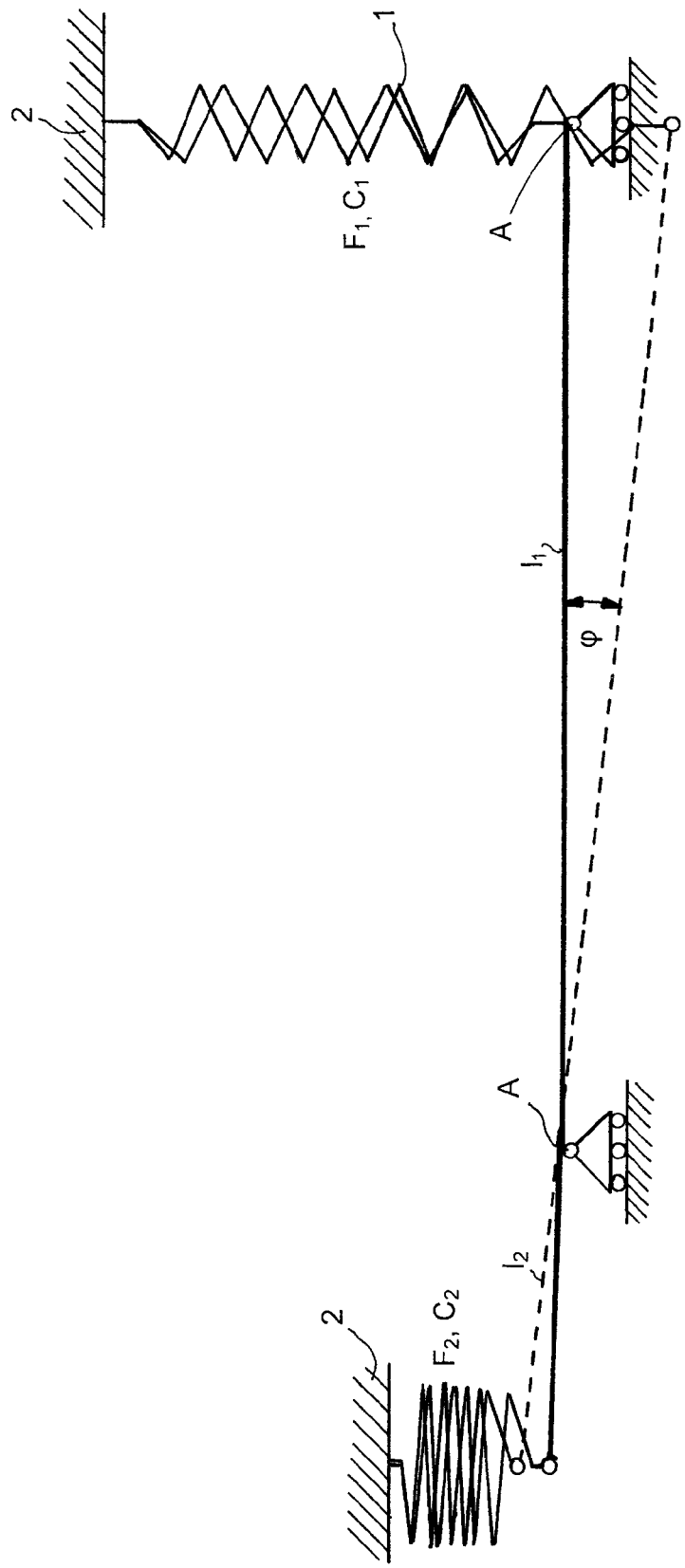
FIGS. 1 and 2 show basic diagrams of brake devices according to the prior art.
Figure 2:
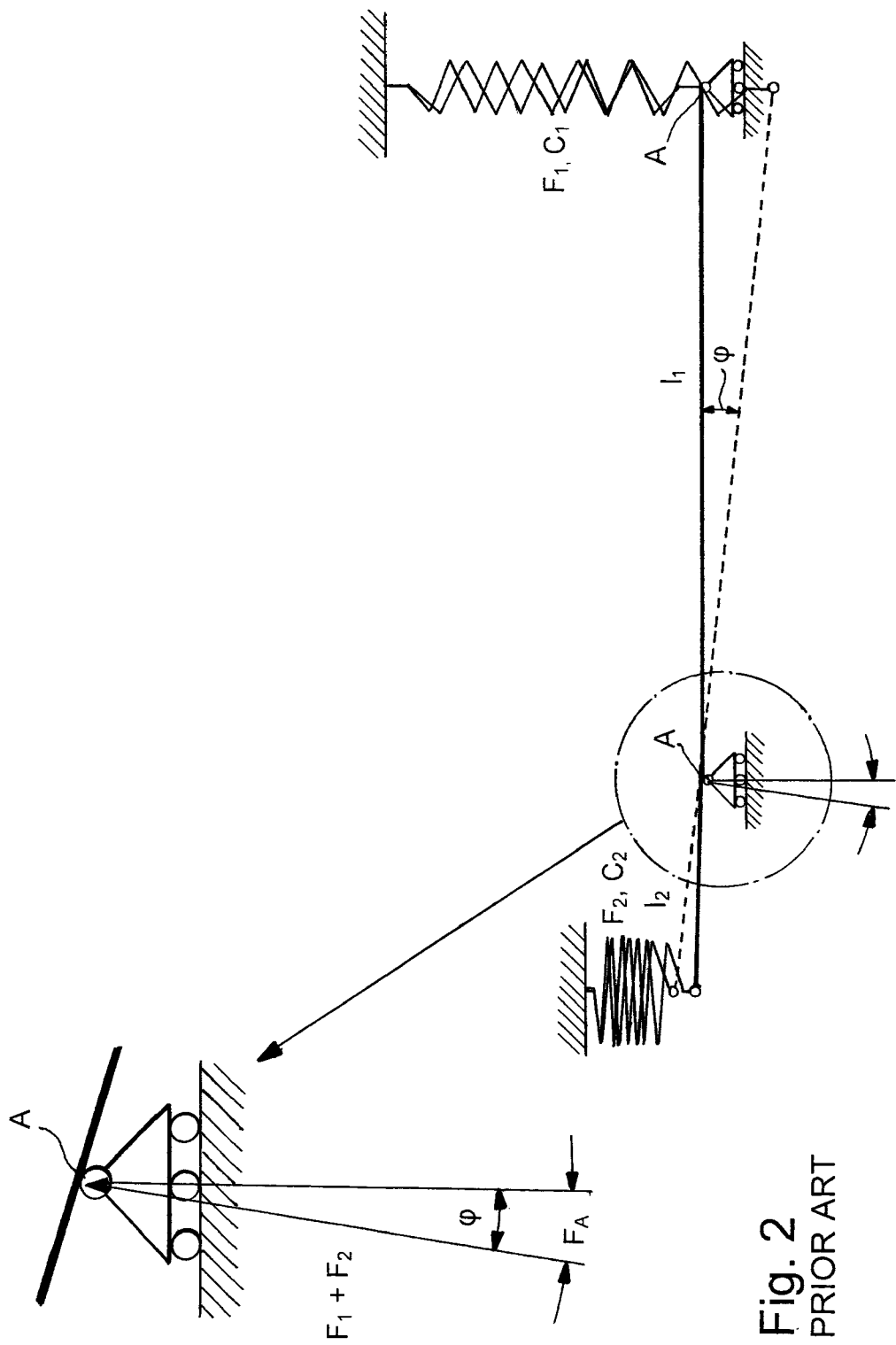
Figure 3:
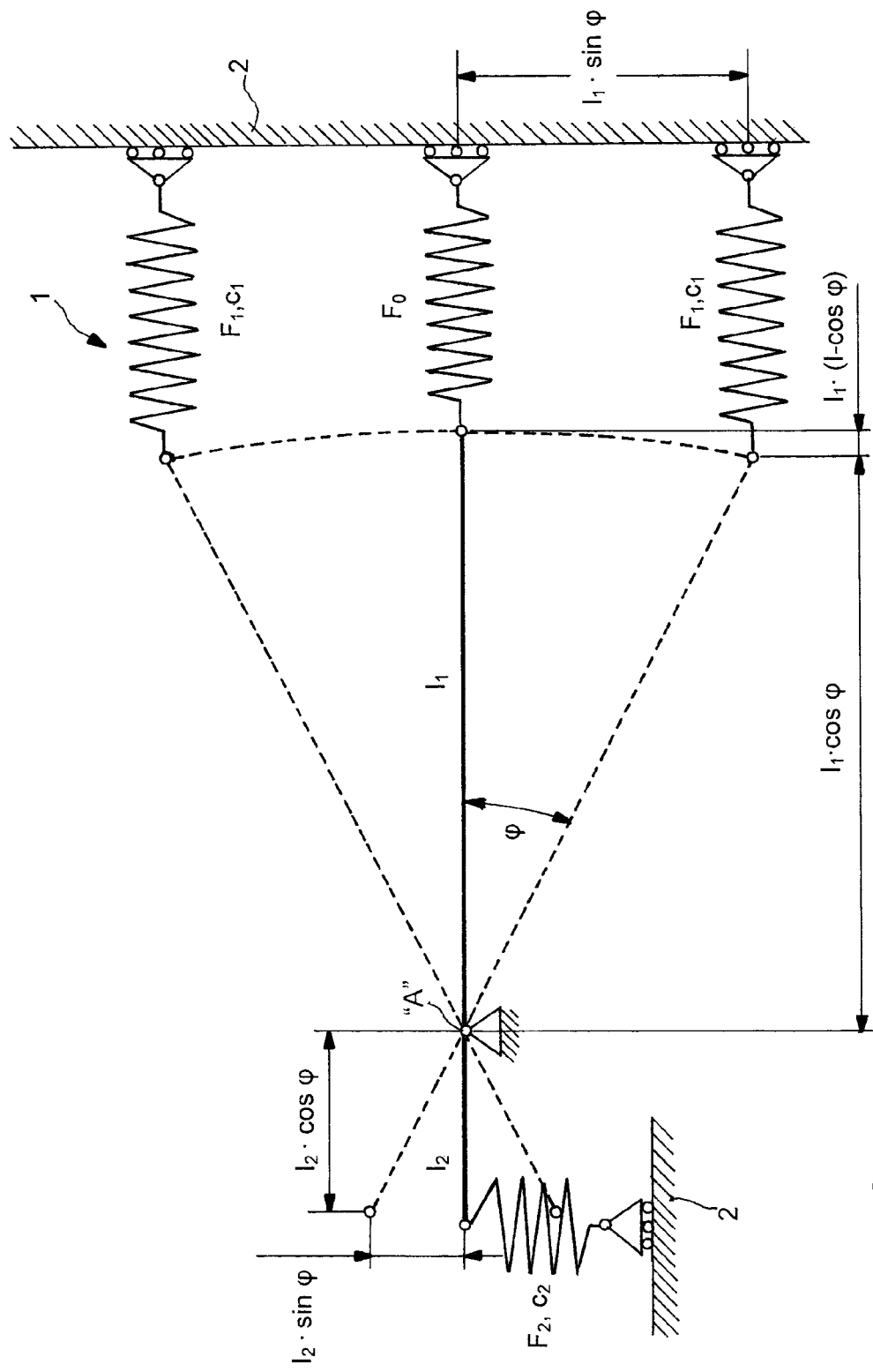
FIGS. 3-11 show basic diagrams of brake devices according to the invention.
Figure 4:
Figure 5:
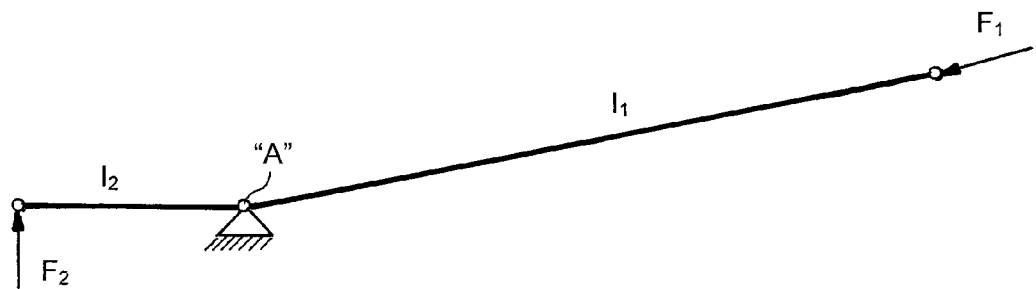
Figure 6:
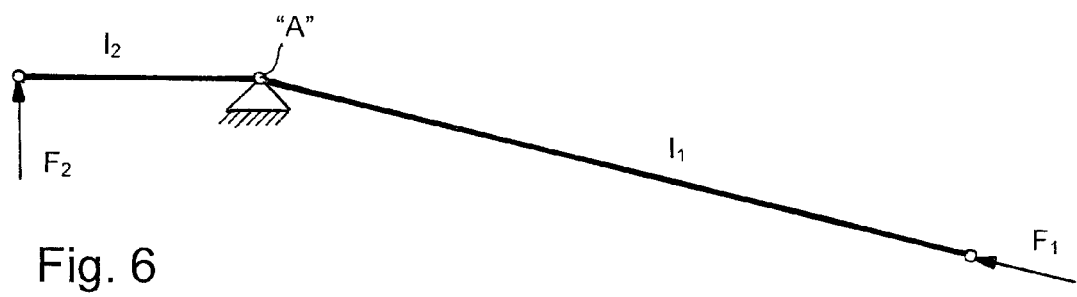
Figure 7:
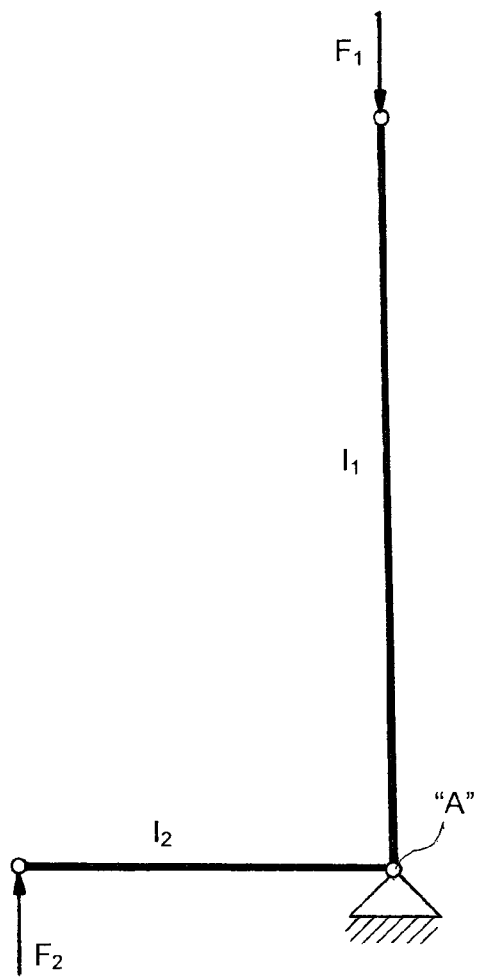
Figure 8:
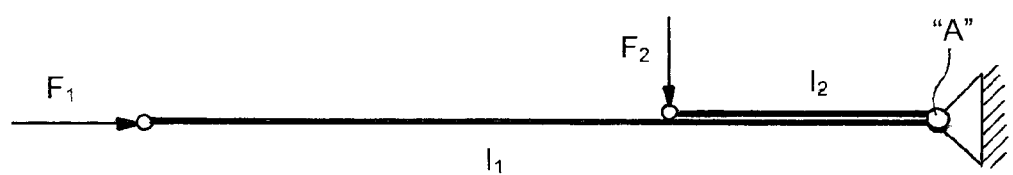
Figure 9:

The brake device of FIG. 3 has a fixed abutment "A", an energy accumulator 1 being supported, on the one hand, on a brake caliper 2 and, on the other hand, via a lever arm $l_1$ on the abutment "A".

The term "brake caliper" is not to be interpreted restrictively. It includes brake frames, brake housings, spring pots and the like, that is to say resilient supporting and holding structures and devices, which are suitable for implementing the brake application concept according to the invention.

The brake caliper 2 has a specific spring characteristic and is illustrated as a spring in the basic diagram.

In the design of FIG. 3, a stable equilibrium state between the energy accumulator and brake caliper is established as a result of the relaxation or tensioning of the spring elasticities of the energy accumulator (lever arm $l_1$) and brake caliper (lever arm $l_2$) according to the ratio of the lever arm lengths $l_1$ and $l_2$ and of the spring rigidities $c_1$ and $c_2$.

The lever arms $l_1$ and $l_2$ can assume any desired angular positions in relation to one another in a predetermined design range with respect to the fixed bearing point "A".

What is essential for fulfilling the equilibrium condition is in this case merely the angular position of the spring forces $F_1$ and $F_2$ in relation to the lever arms $l_1$ and $l_2$.

For the exemplary embodiment of FIG. 3, the following applies:

Compressive force $F_2$: $F_2 = c_2 \cdot l_2 \cdot \sin\varphi$

Compressive force $F_1$: $F_1 = F_0 - c_1 \cdot l_1 \cdot (1 - \cos\varphi)$

Tensile force $F_1$: $F_1 = F_0 + c_1 \cdot l_1 \cdot (1 - \cos\varphi)$ $M_1 = M_2$ $F_1 \cdot l_1 \cdot \sin\varphi = F_2 \cdot l_2 \cdot \cos\varphi$ $[F_0 - c_1 \cdot l_1 \cdot (1 - \cos\varphi)] \cdot l_1 \cdot \sin\varphi = c_2 \cdot l_2 \cdot \sin\varphi \cdot l_2 \cdot \cos\varphi \mid \div \sin\varphi$ $F_0 \cdot l_1 - c_1 \cdot l_1^2 + c_1 \cdot l_1^2 \cdot \cos\varphi = c_2 \cdot l_2^2 \cdot \cos\varphi$ $c_1 \cdot l_1^2 - c_1 \cdot l_1^2 + c_1 \cdot l_1^2 \cdot \cos\varphi = c_2 \cdot l_2^2 \cdot \cos\varphi \mid \text{with: } F_0 = c_1 \cdot l_1$ $\dfrac{c_1 \cdot l_1^2}{c_2 \cdot l_2^2} = \dfrac{\cos\varphi}{\cos\varphi} = 1$ $F_0 = c_1 \cdot l_1$ and $\dfrac{l_1^2}{l_2^2} = \dfrac{c_2}{c_1}$ and also the parallel displacement of the force action lines of $F_1$ and $F_2$ result in a constant equilibrium of the acting torques at the fixed rotary bearing point "A".

The invention is not restricted to the exemplary embodiment of FIG. 3. Further advantageous embodiments of the invention are explained in more detail below.

The mechanism for the exchange of spring-elastic forces, which is in constant equilibrium, is implemented in that the lever arms $l_1$ and $l_2$ can assume any desired angular positions in relation to one another with respect to the fixed bearing point "A".

What is essential for fulfilling the equilibrium condition is merely the angular position of the spring forces $F_1$ and $F_2$ in relation to the lever arms $l_1$ and $l_2$.

Examples of possible embodiments are depicted in FIGS. 4 to 9.

What all these exemplary embodiments have in common is that $F_2$ is at a right angle to the lever arm $l_2$ and $F_1$ acts coaxially to the lever $l_1$.

$l_1$ and $l_2$ are the connecting lines of the force engagement points to the fixed bearing point "A".

$F_1$ and $F_2$ may be both compressive spring forces and tensile spring forces.

Likewise, tensile force at $F_1$ and compressive force at $F_2$, and vice versa, may be combined.

In the version of the device according to the basic principle described, the action direction of the forces $F_1$ and $F_2$ is maintained, that is to say, in the event of a pivoting of the lever, the force introduction point at the end of the lever arm moves away from the line of action of the force.

Figure 10:
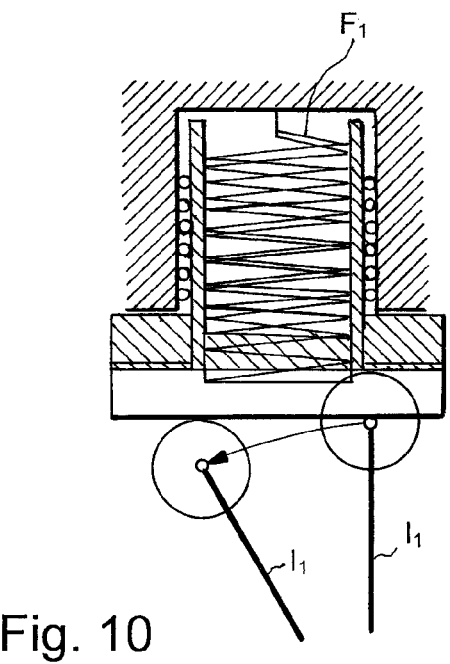

In practice, this requires a straight guidance of the spring element, for example by use of a guide piston 4, and force transmission from the pressure surface of this guide piston 4 to the respective lever arm 5 (see FIG. 10).

Alternatively, a parallel displacement of the spring elements (see FIG. 3) may be carried out.

The piston guidance of the spring elements entails an outlay in terms of construction, and additional friction arises in the piston guide.

Figure 11:
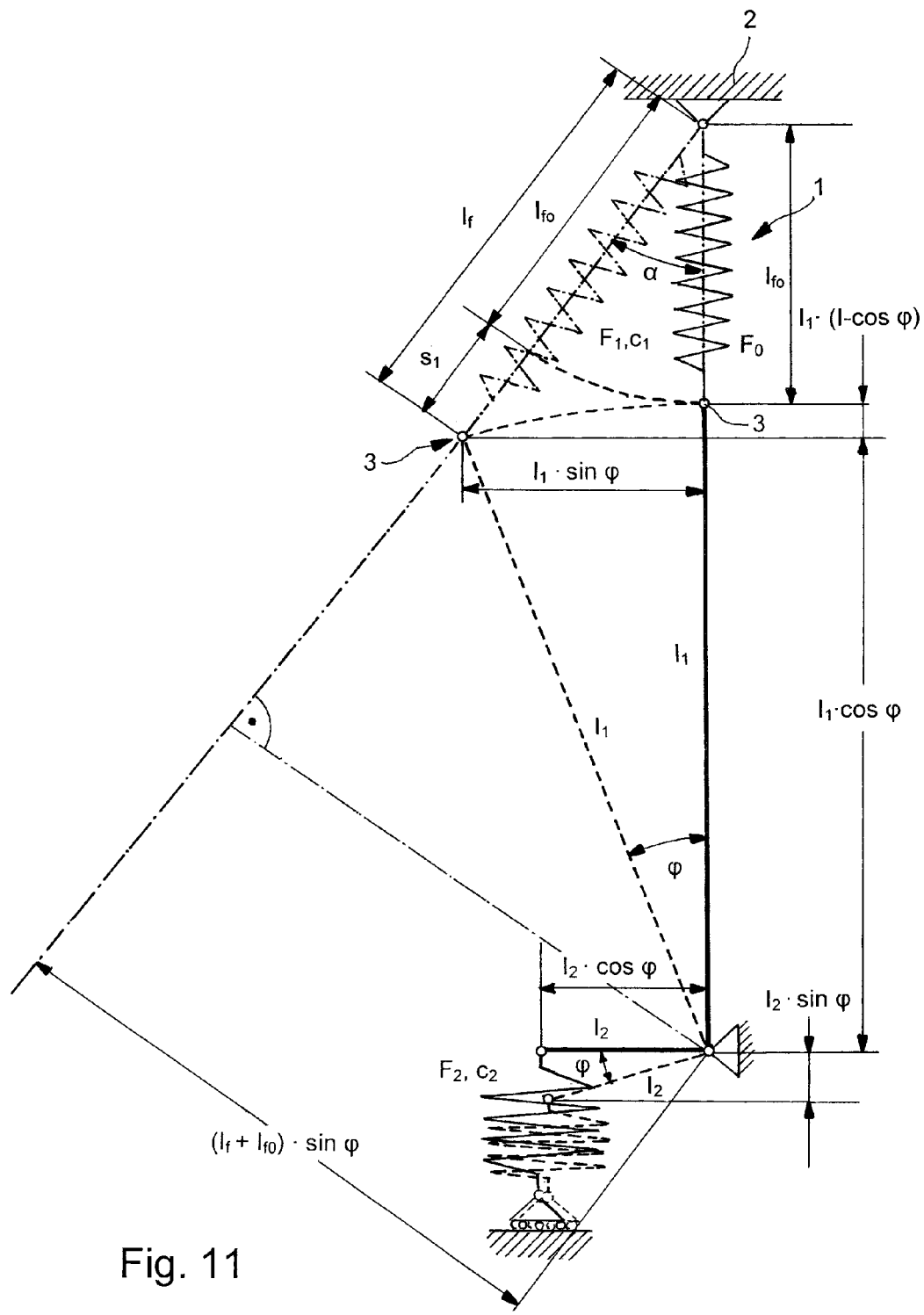

These disadvantages can be avoided if the spring elements, in particular the spring element forming the energy accumulator, are tied to the lever arms $l_1$ in an articulated manner and therefore, during the pivoting of the lever $L_1$, the action directions of the spring forces also execute a pivoting movement. A pivoting spring principle of this type is depicted in FIG. 11.

Here, the articulation point of the spring 1 on the brake caliper 2 is fixed and is invariable.

The articulation point 3 of the spring 1 on the lever arm $l_1$ between this point and the abutment A is, by contrast, variable, for example in that the lever arm $l_1$ is pivotable about the abutment A, so that the articulation point 3 between the spring 1 and lever 1 moves on an arc of a circle.

Deriving the equilibrium condition by calculation is more difficult here than in the basic principle, since it becomes clear that at least one of the variables $l_1$, $l_2$, $c_1$ and $c_2$ must be variable as a function of the pivot angle in order to fulfill the equilibrium condition. However, an analysis of the equilibrium condition has led to the surprising recognition that a sufficiently accurate approximation to the equilibrium condition is possible by means of the measure, to be implemented relatively simply, of the lead angle on the lever arm $l_2$ (see FIGS. 12 and 13).

What is achieved by the progression, achievable by means of the lead angle, of the overall step-up is that the actually effective lever arm $l_2$ corresponds approximately to the relation $$l_2^2(\phi)=(l_{20}\cdot\cos\phi)^2=l_{20}^2\cdot\cos^2\phi$$

The equilibrium condition for the pivoting lever principle can consequently be derived as follows:

$$\frac{2\cdot l_1^2 \cdot c_1}{c_2} \cdot \frac{2-\sqrt{5-4\cdot\cos\varphi}}{\sqrt{5-4\cdot\cos\varphi}} = l_2^2(\varphi)\cdot\cos\varphi;$$

$$\frac{2-\sqrt{5-4\cdot\cos\varphi}}{\sqrt{5-4\cdot\cos\varphi}} \approx \cos^3\varphi \text{ for } \varphi \text{ in the range of } 0° \text{ to } 45°$$

with $l_2^2(\varphi) = (l_{20}\cdot\cos\varphi)^2 = l_{20}^2\cdot\cos^2\varphi$ inserted:

$$\frac{2\cdot l_1^2 \cdot c_1}{c_2} \cdot \frac{2-\sqrt{5-4\cdot\cos\varphi}}{\sqrt{5-4\cdot\cos\varphi}} = l_{20}^2\cdot\cos^2\varphi\cdot\cos\varphi$$

$$\frac{2\cdot l_1^2 \cdot c_1}{l_{20}^2 \cdot c_2} \cdot \frac{2-\sqrt{5-4\cdot\cos\varphi}}{\sqrt{5-4\cdot\cos\varphi}} = \cos^3\varphi$$

$$\frac{2\cdot l_1^2 \cdot c_1}{l_{20}^2 \cdot c_2} = \frac{\sqrt{5-4\cdot\cos\varphi}}{2-\sqrt{5-4\cdot\cos\varphi}} \cdot \cos^3\varphi \approx 1$$

Figure 12:
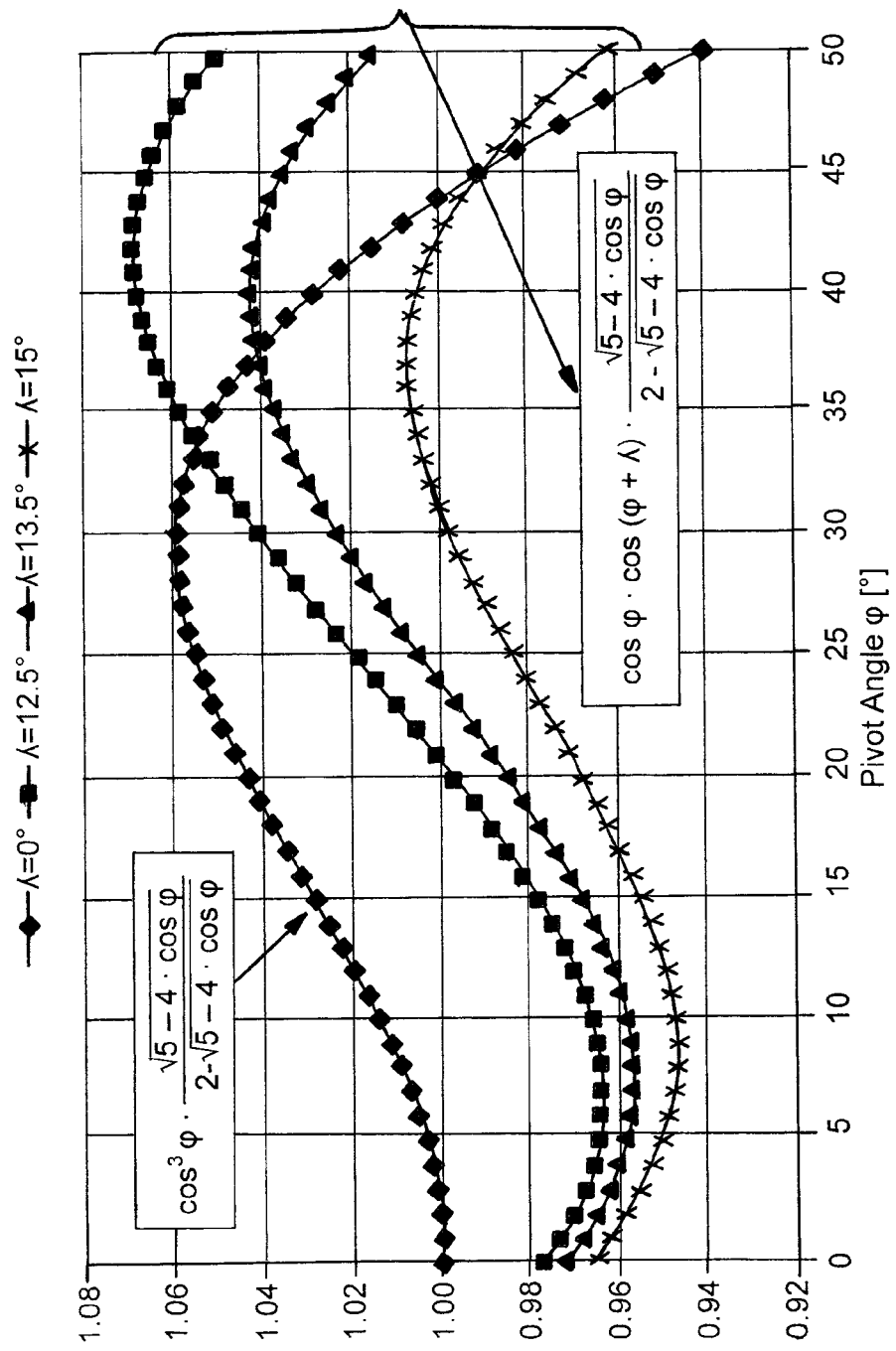
FIG. 12 shows a graph.

FIG. 12 shows the resulting deviations from the equilibrium condition as a result of the approximation to the relation $l_2^2(\phi)=(l_{20}\cdot\cos\phi)^2=l_{20}^2\cdot\cos^2\phi$ by the cosine function displaced by means of the lead angle.

The error amounts to max. approx. 5% and can be made zero by a selection of the suitable lead angle, particularly in the range of large pivot angles and consequently high brake forces.

Figure 13:
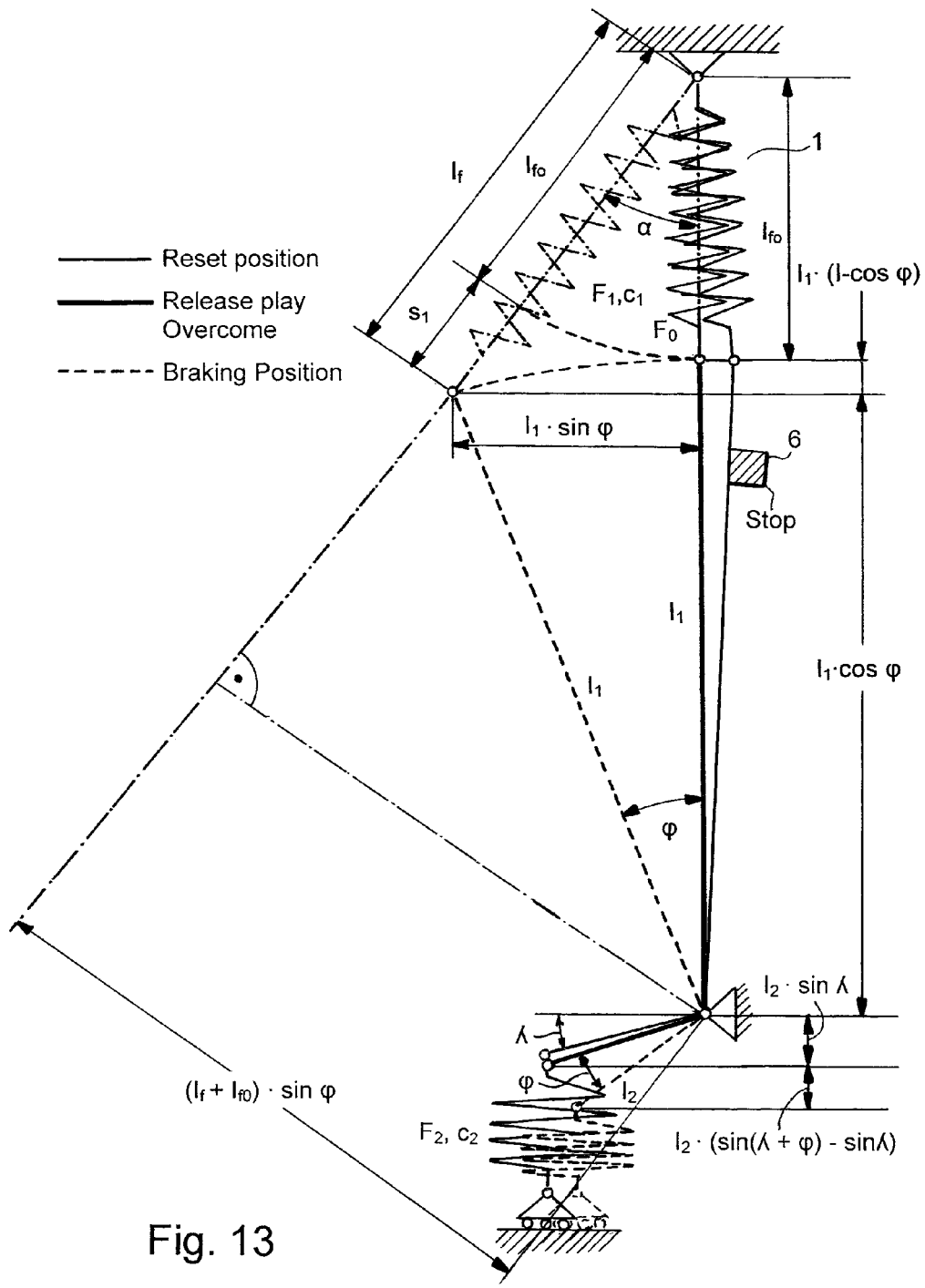
FIG. 13 shows a further basic diagram of a brake device according to the invention.

To set a stable rest position of the brake actuation mechanism, it is advantageous to position the lever arm $l_1$ a few degrees of angle before dead center. This is illustrated in FIG. 13.

In addition to the stable rest position at a defined stop 6, what is achieved by this arrangement is that the release play of the brake can be overcome essentially even before this dead center position is overshot. Consequently, no unnecessary stroke loss of the accumulator spring for overcoming the release play is caused.

Figure 14:
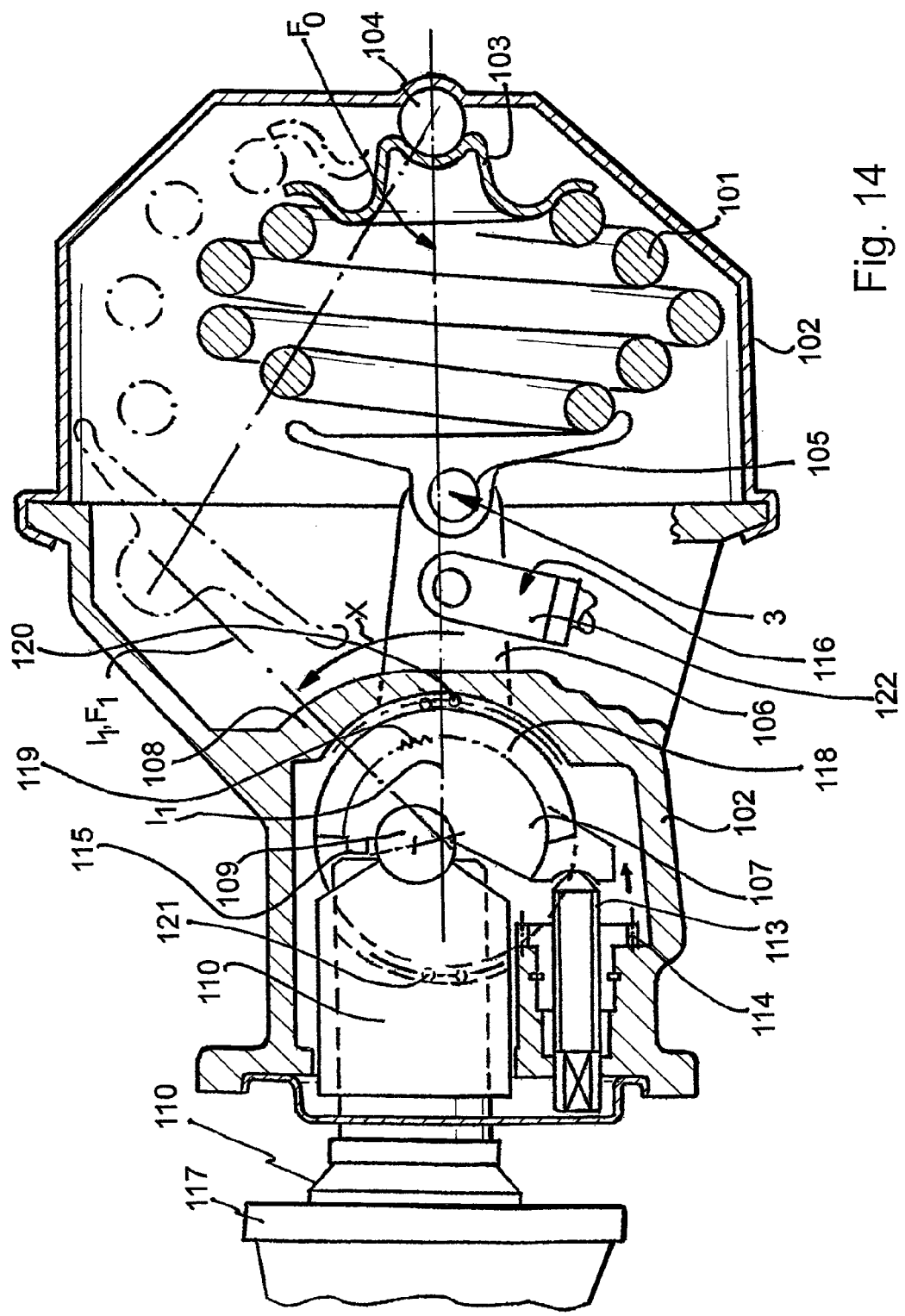
FIG. 14 shows a sectional illustration of the set-up of a disc brake according to the invention.

FIG. 14 shows a cross section through a possible structural version of the brake according to the invention. One of the possible embodiments of the lead angle adjustment can be seen from the illustration.

The brake device of FIG. 14 is designed as a disc brake. It has a brake caliper (here, a brake housing with a spring pot) 102 which surrounds a brake disc (not illustrated here), for example in its peripheral region, in a frame-like manner.

An accumulator spring 101 is arranged as an energy accumulator in the brake caliper. This accumulator spring is supported with one of its ends, here via a support bearing, such as plate 103, and a rolling body, such as a shaft or a ball 104, on the inside of the brake caliper or, here, of the spring pot 102 in the region facing away from the brake disc.

The end, facing the brake disc, or the front region of the accumulator spring 101 is articulated at the joint 105 as articulation point 3 on a pivotable brake lever 106 (also called a rotary lever) as the lever arm $l_1$, which brake lever 106 is supported via a roller bearing or plain bearing 120 on an inner wall 108 of the brake caliper 102.

In this case, the eccentric-like end 107 of the brake lever 106 is designed as part of an adjusting eccentric 118 which, also in addition to the brake disc, is supported on a brake caliper-supported support bearing 121 (also as a structural unit with the support bearing 121), the adjusting eccentric 118 acting via a shaft 109, as a rotary mounting, on at least one pressure piece 110 (preferably, an adjusting-spindle/pressure-piece combination) or on a plurality of pressure pieces. The pressure piece moves a brake pad 117 in the direction of the brake disc (not illustrated here; on the left of the brake pad 117). The brake caliper may in this case include the brake disc. On the reaction side, at least one electrical adjustment device could likewise be arranged (likewise not illustrated here) in the caliper.

If the accumulator spring 101 is released from its tensioned position in that the brake lever 106 is moved along the path of the arc marked by the arrow x by a linear adjuster 116 (with assigned actuator, in particular an electric motor) engaging on the brake lever at an angle (or here even essentially perpendicularly), the accumulator spring follows the rotary lever 106 and applies the brake via this, so that the latter, in the same way as a spreading wedge, displaces the shaft 109 and consequently the pressure piece 110 in the direction of the brake disc. Depending on the design, further brake application, for example in the case of a fixed caliper, takes place by a displaceable brake disc being pushed forward onto the reaction-side brake pad. Other forms of construction of the brake caliper may be envisaged.

The abutment A of the brake device of FIG. 14 lies in the shaft 109. The lever arm $l_1$ is implemented via the rotary lever 106.

The eccentric arrangement of the brake lever is divided into the outer lever mounting 120, which is combined with the support bearing 121 for supporting the accumulator spring force in the non-actuated state of the brake, and the adjusting eccentric 118 received inside, in a half-shell mounting.

Advantageously, the adjusting eccentric 118 is provided at least partially on its outer circumference with a latching toothing 119, which is also present in complementary form on the inner circumference of the lever bearing shell 112 of the lever mounting 120.

What is achieved by a relatively flat wedge angle of the latching toothing is that, during brake actuations, the adjusting eccentric 112 is not rotated in reverse, but can be adjusted in the force-free rest state of the brake lever.

An adjusting spindle 113 engages on the adjusting eccentric 118 and is connected via the drive wheel 114 to an adjusting gear. With an increase in brake pad wear, the adjusting spindle 113 is moved upward as a result of the rotational movement introduced by the adjusting device. The adjusting spindle moves the adjusting eccentric 118 toward greater lead angles.

By a suitable selection of the drive step-up of the rotary drive and the pitch of the adjusting spindle 113, the best possible compensation for the influence of the brake pad wear on the overall rigidity of the brake caliper 102 is achieved by way of this lead angle adjustment.

The return of the adjusting eccentric 118 in the event of a change of the brake pad takes place, for example, automatically, in that the adjusting spindle moving back causes, with its end face facing the brake lever, the adjusting eccentric 118 to move back via its return bosses 115.

The adjusting drive, here the linear drive 116, for the brake lever 106 engages directly on the brake lever 106. It has a tappet 122 which is linearly movable. The latter is activated and controlled by the brake and can be implemented in the most diverse possible embodiments. Thus, instead of the linear adjuster, a direct rotary drive by way of a gearwheel or wormgear on the bearing shaft of the brake lever may also be implemented (not illustrated here). The design of FIG. 14 requires only a very small drive with low drive power and nevertheless, preferably in combination with a suitable control, provides a fully functional disc brake even for heavier commercial vehicles.

Figure 15:
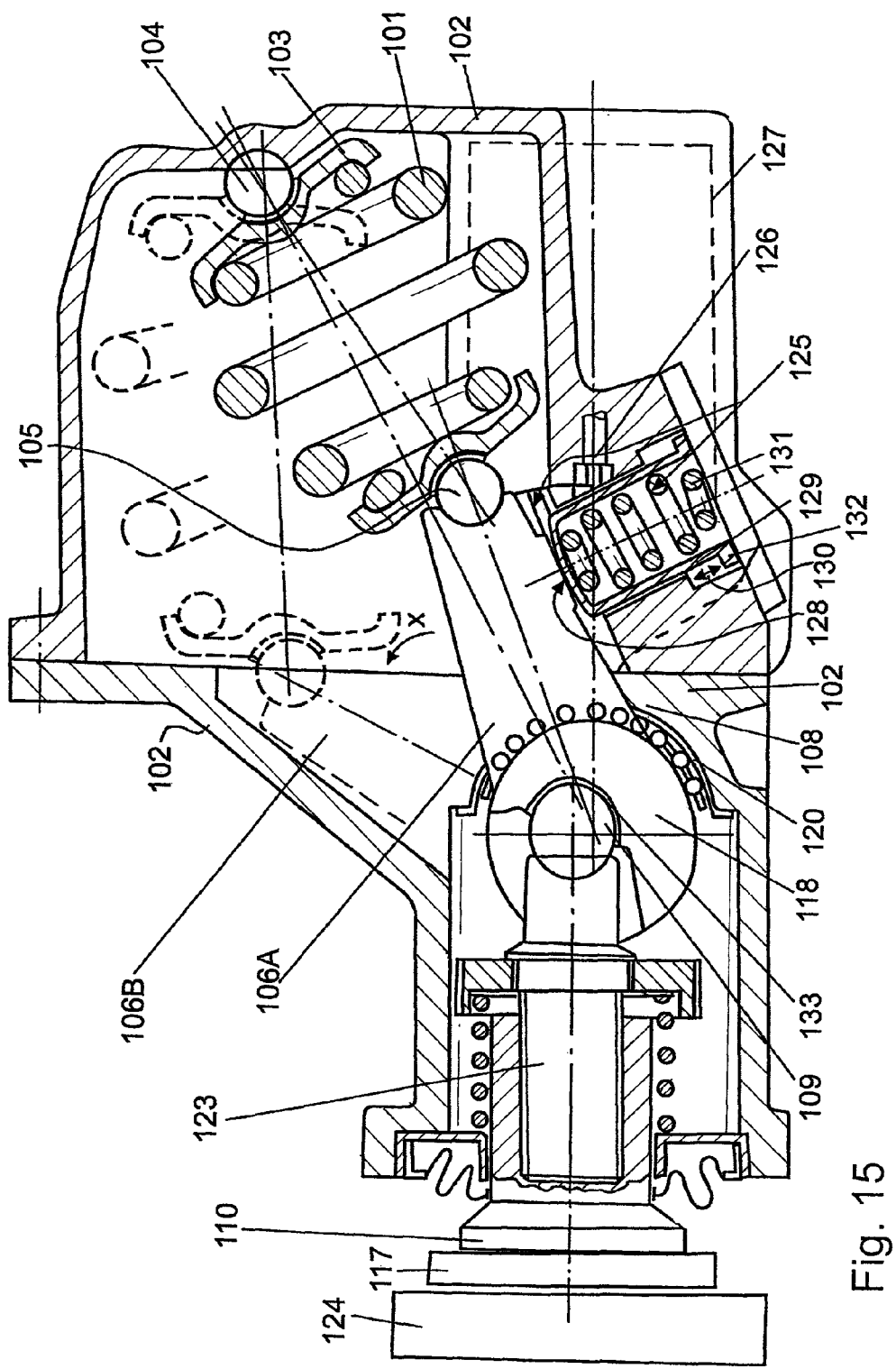
FIG. 15 shows a sectional illustration of the set-up of a further disc brake according to the invention.

The brake device of FIG. 15 is also designed as a disc brake. It has, once again, a brake caliper (here, a brake housing with the spring pot 102), which surrounds a brake disc (again not illustrated here), for example in its peripheral region, in a frame-like manner. The set-up corresponds with regard to many components to that of FIG. 14. Thus, the disc brake of FIG. 15 also has as an energy accumulator or the accumulator spring 101 which, in turn, is supported via a support bearing with the plate 103 and with the rolling body 104 on the inside of the brake caliper 102.

That end of the accumulator spring 101 which faces the brake disc is again articulated at the joint 105 as the articulation point on the pivotable brake lever 106 as the lever arm l1 which is supported via the roller bearing or plain bearing 120 on the inner wall 108 of the one-part or, here, multi-part brake caliper 102.

In this case, here too, the eccentric-like end 107 of the brake lever 106 is designed as part of an adjusting eccentric 118, the adjusting eccentric 118 acting on the pressure piece 110 preferably via a plain bearing 133, the shaft 109 as a rotary mounting and preferably a spindle/nut combination 123 (if appropriate, with an integrated adjusting arrangement for adjusting the lining and disc wear), which pressure piece, in turn, moves the brake pad 117 in the direction of the brake disc 124, indicated diagrammatically here.

The accumulator spring 101 can again be transferred out of a release position (brake not applied) 106A into an application position (brake applied) 106B. To move the accumulator spring between the positions A and B, once again, an actuator is used which engages virtually at right angles on the brake lever 106. Here, the rotary lever has arranged on it a contrate wheel segment 125, the toothing of which meshes with an output pinion 126 of an electric-motor/gear arrangement 127. When the electric motor rotates, the contrate wheel segment 125 moves, together with the rotary lever 106 fastened to it, which is thus movable between the positions 106A and 106B.

Depending on the design, further brake application takes place, for example, by way of the accumulator spring via the rotary lever 106, in the case of a fixed caliper, by a displaceable brake disc being pushed forward onto the reaction-side brake pad. Other forms of construction of the brake caliper may be envisaged.

The abutment A of the brake device of FIG. 15 also lies in the shaft 109. The lever arm l1 is implemented by the rotary lever 106.

In this case, in the release position of the brake, the long lever arm 106 of the brake lever is pivoted beyond its top dead center and is brought to bear, with the spring force then acting opposite to the actuation direction, against a housing-side stop (on the brake caliper; position 106B). In this case, the pivoting travel of the lever 106 going beyond top dead center is dimensioned such that, when the brake is actuated, the release play of the brake is exactly overcome when this pivoting travel from the stop position to top dead center is covered. Consequently, the force stroke of the brake commences even at top dead center without any travel loss.

However, particularly in embodiments of the invention as commercial vehicle brakes, a relatively large pivot angle going beyond top dead center is required because of the relatively high release plays, customary in commercial vehicle brakes, until the stop position is reached. This, in turn, leads, under the action of the force of the accumulator spring 101 which in this state acts counter to the actuation direction of the rotary lever 106, to high pressure forces of the rotary lever 106 against the stop point and consequently, at the commencement of brake actuation, to a high force threshold which has to be overcome by the drive of the brake (that is to say the actuator with the electric motor).

According to a further development which is also to be considered independently as inventive, this problem is solved in that the operation of applying the brake takes place at a low force threshold which is dimensioned such that, in the non-actuated state of the brake, the brake lever or rotary lever 106 is exactly held reliably at the stop 128 against possible vibratory effects, in order to avoid wear on the lever and stop.

This idea can be implemented particularly in that the stop 128 used is a sprung stop 128, which has at least one stop spring 131.

The sprung stop 128 is preferably dimensioned such that, with the brake lever lifted off, that is to say actuated (position 106A), the stop is moved by spring force into a first position which corresponds approximately to the top dead center position of the brake lever 106 (that is to say, in FIG. 15, the spring axis and the lever arm 106 are in alignment) or which lies just "before this". And, when the brake lever is brought to bear into the position 106B, it is displaced by the force of the accumulator spring 101 acting on the brake lever, counter to the spring force acting on the stop 128, into a second position which is the stop position of the brake lever (FIG. 15).

According to FIG. 15, the sprung stop has as a spring a helical spring 131 arranged in a stop pot 129, which is movable on the brake caliper between two stop positions. Thus, the stop pot 129 may have a collar 132 which is displaceable to a limited extent in an annular space 130 in the brake caliper.

By a suitable dimensioning of the force of the stop spring 131, here of the helical spring 131, and, above all, by a selection of a suitable force profile of the latter, the return force of the accumulator spring 101 acting on the brake lever 106 can be reduced to the desired extent. In this case, in the first position, the stop spring 128 has only a low force which then, during displacement into the second position, likewise increases sharply according to the sharply increasing force action of the accumulator spring on the brake lever. Preferably, spring construction types are used which also have a damping action such as, for example, stacked cup springs (not illustrated here).

Many different solutions may be envisaged for implementing the sprung stop. FIG. 15 is, to that extent, not to be understood as being restrictive, but merely shows a particularly preferred embodiment of simple build.

A brake actuation mechanism was described above in which the energy stored in the spring-elastic element (for example, the steel helical spring or, here, accumulator spring 101) is transmitted via a force step-up mechanism, for the purpose of generating the tension force, to the brake mechanism to be spread open.

In the implementation of brake actuation systems which utilize the tension energy of an accumulator spring in order, by a force transmission mechanism of variable step-up, to spread the brake caliper without the supply of external energy and to relieve it again (energy swing systems), a pronounced disturbing influence arises due to the broad dispersion width of the rigidity of the brake pads.

This dispersion arises due to production tolerances, because of the thickness variable on account of wear and as a result of the temperature rise in the linings during braking operations. A minimum actuation energy requirement is achieved, in energy swing systems, only when the rigidities (that is to say, the spring constants) of the brake caliper and accumulator spring remain constant within narrow limits. This is not the case for the above-mentioned reasons.

The influence of brake lining pressure on the rigidity of the brake caliper can be safely determined in tests.

Owing to the dispersion width of the caliper rigidities which is capable of being confirmed in tests, different required torques arise on the brake lever between minimum and maximum caliper rigidity up to 800 Nm. Even if the compression spring is rated in terms of the average value of caliper rigidity, a differential torque of approximately 400 Nm remains which would have to be applied by the drive of the brake.

To that extent, the invention provides an even further optimized brake design in order to counteract the adverse effect described.

The invention, moreover, makes use of a correcting action in order to compensate the influence of the brake pad wear and, where appropriate, also of the brake pad temperature on the overall rigidity of the brake caliper 102.

Conventionally, the brake calipers of known disc brakes are configured such that, when the brake is actuated, only a minimal spreading open (flexing) of the caliper takes place. This measure keeps the actuation energy requirement low.

In energy swing brakes which procure the actuation energy from an integrated accumulator spring 101, the deformation behavior can be optimized according to other criteria.

Since the deformation of the brake caliper is a constant fraction of the overall elasticity and the lining pressure is the variable fraction, it is advantageous to bring about a greater spreading open of the brake caliper than in conventional brakes, and the lining pressure.

Since the properties of the brake pads can be influenced to only a slight extent during the heating of the brake, correcting actions are required. These can be carried out via the actuating mechanism of the brake.

Essential correcting possibilities according to the invention are:
 a) a variation in the pretension of the accumulator spring;
 b) a variation in the angle between the long and the short lever arm (lead angle position for short lever arm);
 c) a variation in the overall angular position of the lever (displacement of the operating position, for example by a variation of the release play); and
 d) a displacement of the spring abutment on the brake housing.

Figure 16:
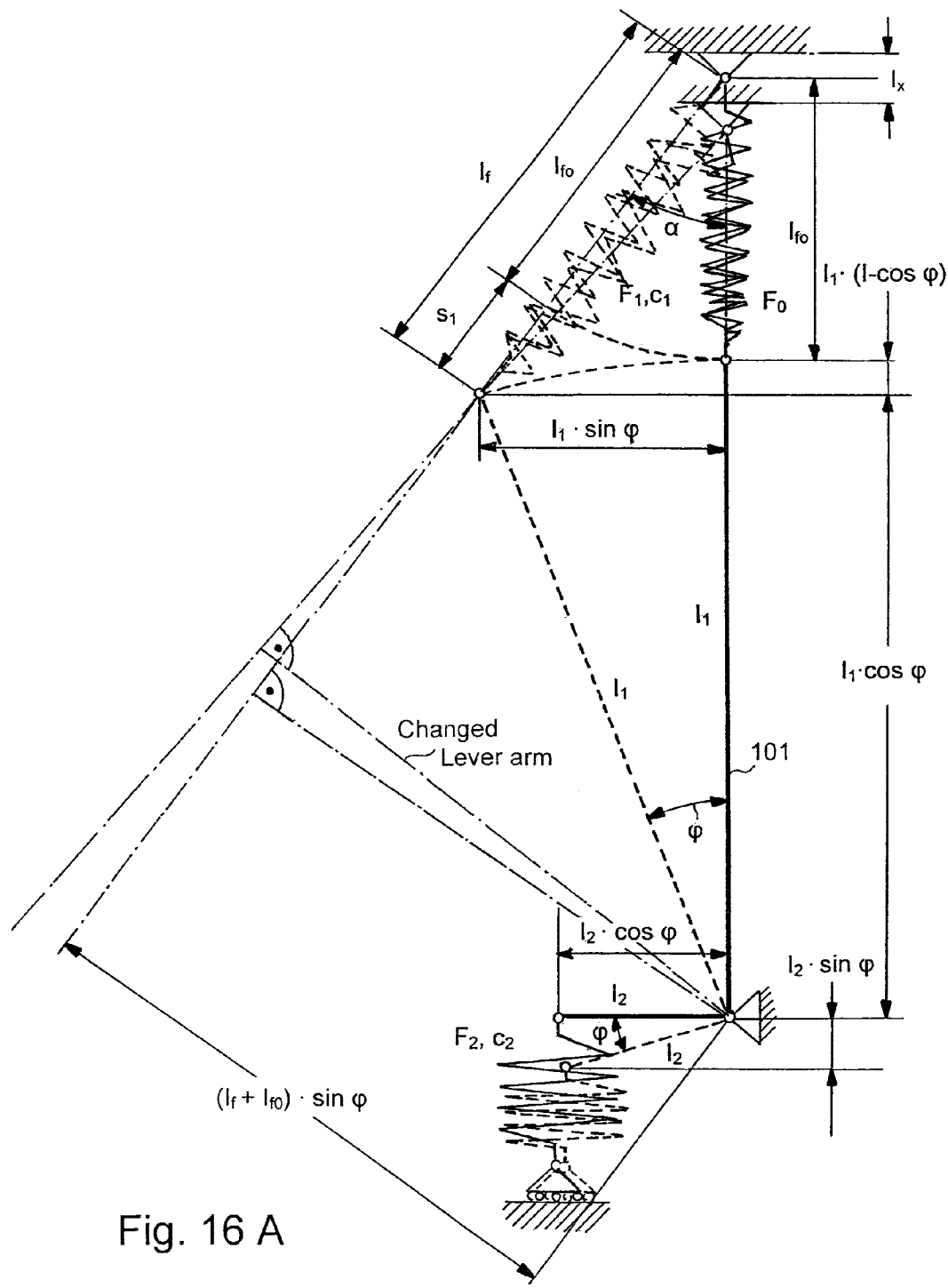
FIGS. 16a-d show diagrammatic illustrations of the functional principle of further alternative embodiments of the invention.
Figure 16:
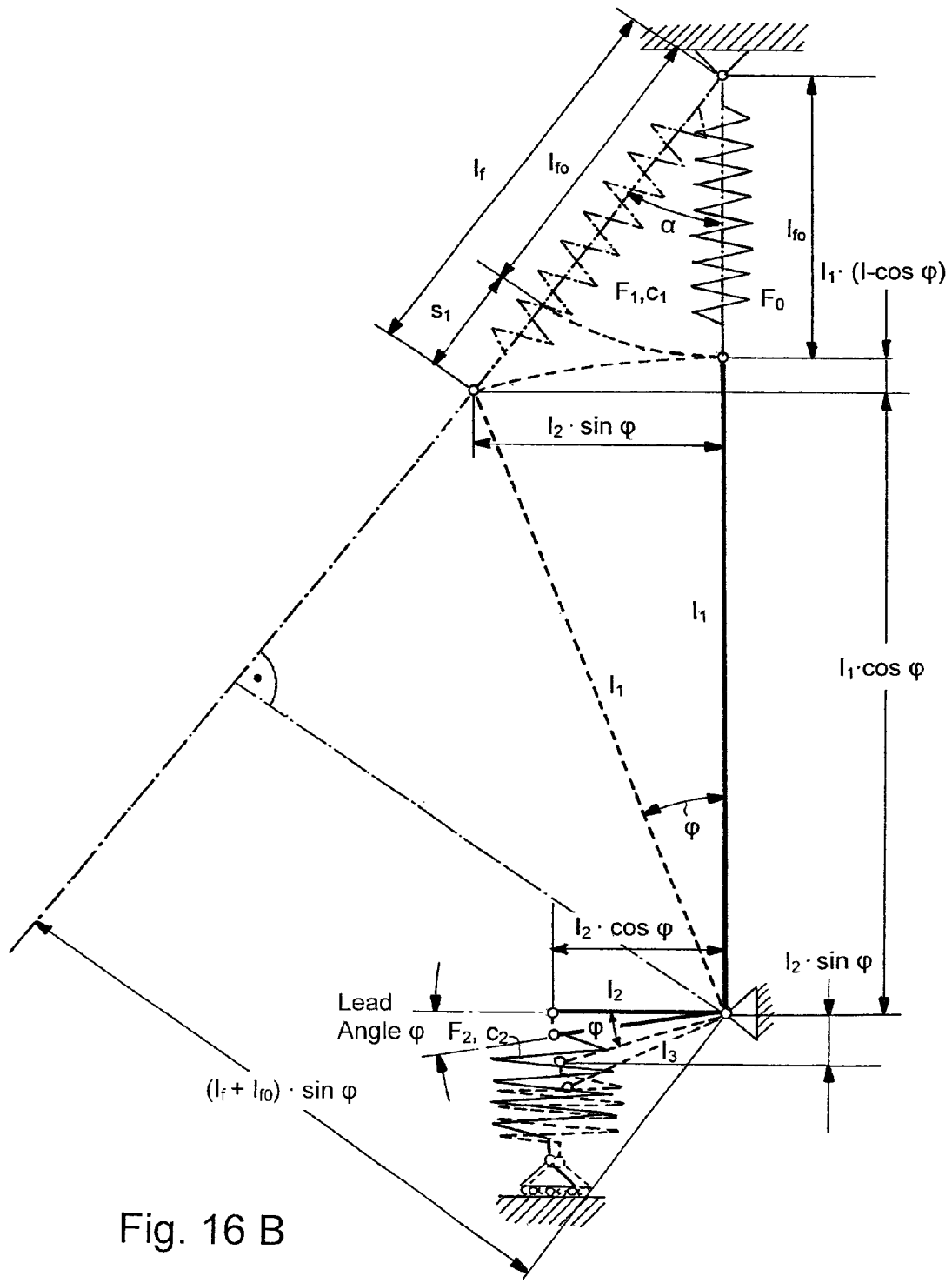
Figure 16:
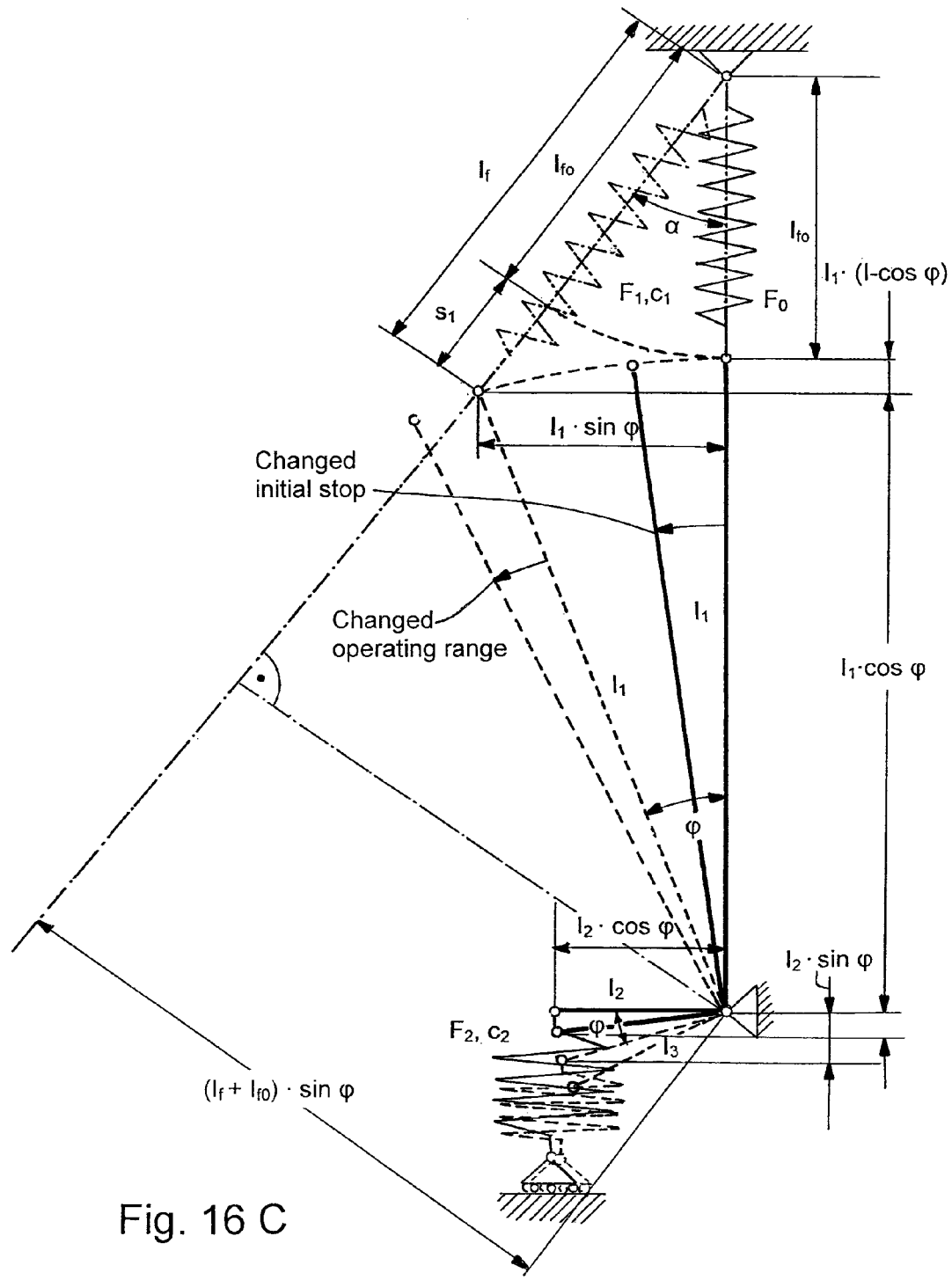
Figure 16:
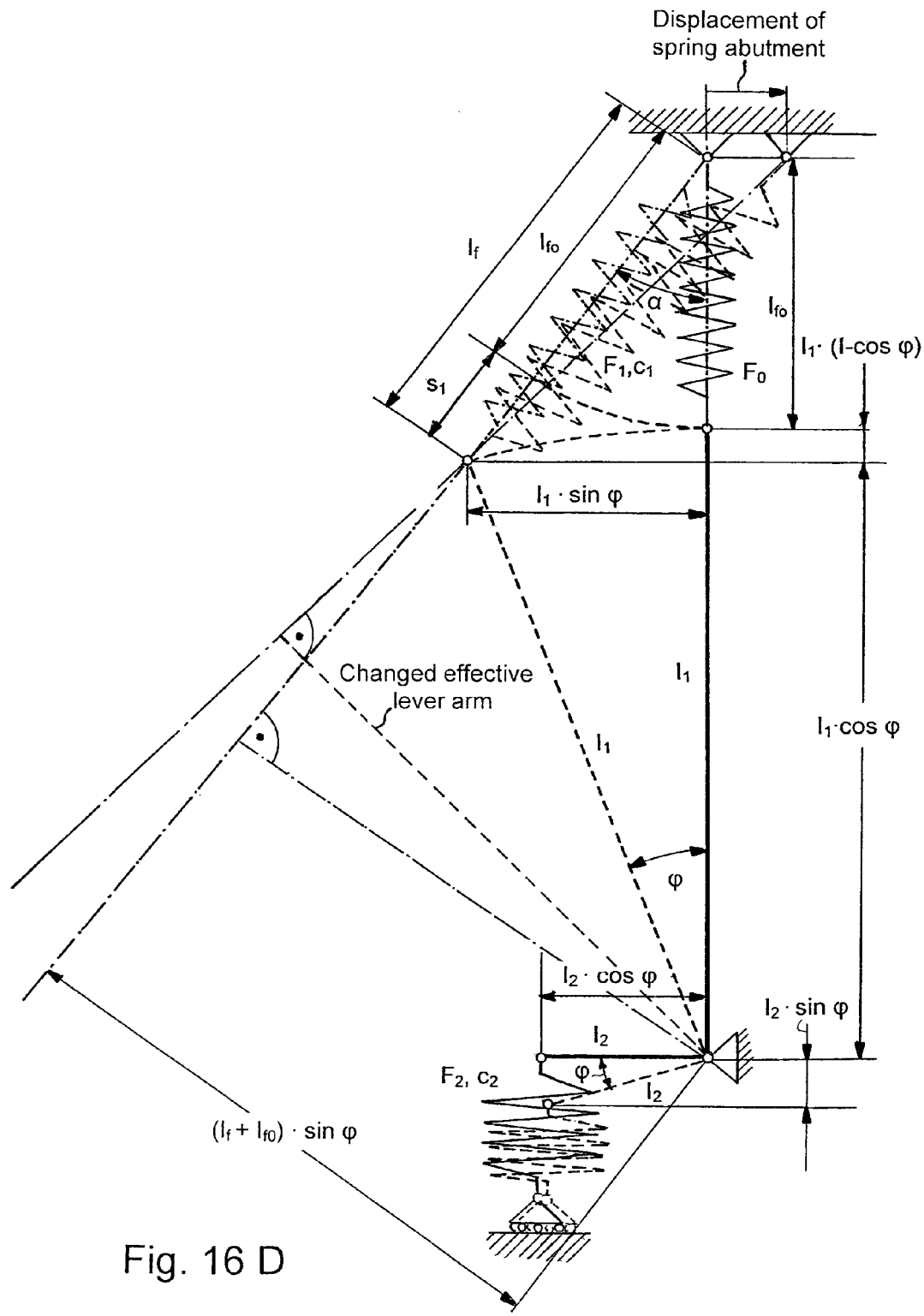

The correcting possibilities are implemented in that one or more of the following arrangements, if appropriate even in combination, are provided:
 a) an arrangement for varying the pretension of the accumulator spring (FIG. 16a);
 b) an arrangement for varying the angle between the long and the short lever arm (lead angle position for the short lever arm) (FIG. 16b);
 c) an arrangement for varying the overall angular position of the lever (displacement of the operating position, for example by a variation of the release play) (FIG. 16c); and
 d) an arrangement for displacing the spring abutment on the brake housing (FIG. 16d).

According to FIG. 16a, the arrangement for varying the pretension of the accumulator spring is implemented by an arrangement for displacing an articulation point of the accumulator spring 101 (for example, a spindle, not illustrated here, or a displaceable bolt or the like), by which, in principle, the length of the accumulator spring 101 can be varied in its rest position, for example by the amount of the travel lx. The adjustment of this arrangement may be provided as a setting measure, for example during first assembly or in servicing.

According to FIG. 16b, by contrast, an arrangement for varying the angle between the long and the short lever arm is provided, by which the lead angle $\phi$ (FIG. 16b) can be adjusted.

By contrast, producing a variable lead angle position of the short lever arm under the action of the wear adjustment system can be carried out more simply. Thus, an adjusting eccentric may be provided as an arrangement for varying the angle between the long and the short lever arm.

In this case, a lead angle displacement is brought about in a simple way, by use of an adjusting screw coupled to the wear adjustment system, by rotating the adjusting eccentric in the tension force-free state of the lever. This solution is particularly suitable for adapting to the wear-dependent increase in overall rigidity of the brake caliper.

FIG. 16c similarly shows an arrangement for varying the overall angular position of the lever (displacement of the operating position, for example by varying the release play). The variation in the overall angular position is advantageously carried out in the tension force-free state of the brake, that is to say in the rest position of the brake lever. In this case, the stop position of the brake lever and/or the release play of the brake are/is varied. This measure with an adjustable lever stop and/or variable release play is particularly suitable for compensating the temperature-dependent reduction in the overall rigidity of the brake caliper.

FIG. 16d, finally, illustrates an arrangement for displacing the spring abutment on the brake housing (FIG. 16d).

The displacement of the spring abutment is a particularly suitable measure for adapting the self-release behavior of the brake to the different requirements of the service brake situation BBA and of the parking brake situation FBA.

In the event of a displacement of the abutment in the pivoting direction of the brake lever, the action direction of the spring force is varied such that, with sufficient displacement, the brake opens automatically on account of the smaller effective lever arm. This is the state required for the service brake situation. In the event of the displacement of the abutment opposite to the pivoting direction of the brake lever, the varied action direction of the spring force gives rise to a larger effective lever arm, so that, with sufficient displacement, the tension force on the brake caliper as a result of the action of the accumulator spring is maintained. This is the state desired for the parking brake situation.

This operation is described below with reference to FIG. 17 "parking brake operating mode":

Three lever positions are illustrated in the sketch:

I—Non-actuated state. Rest position of the brake lever at the sprung stop.

II—Commencement of service brake actuation. Position of the lever after the release play is overcome and before the start of force build-up.

III—Service or parking brake position of the brake lever.

Figure 17:
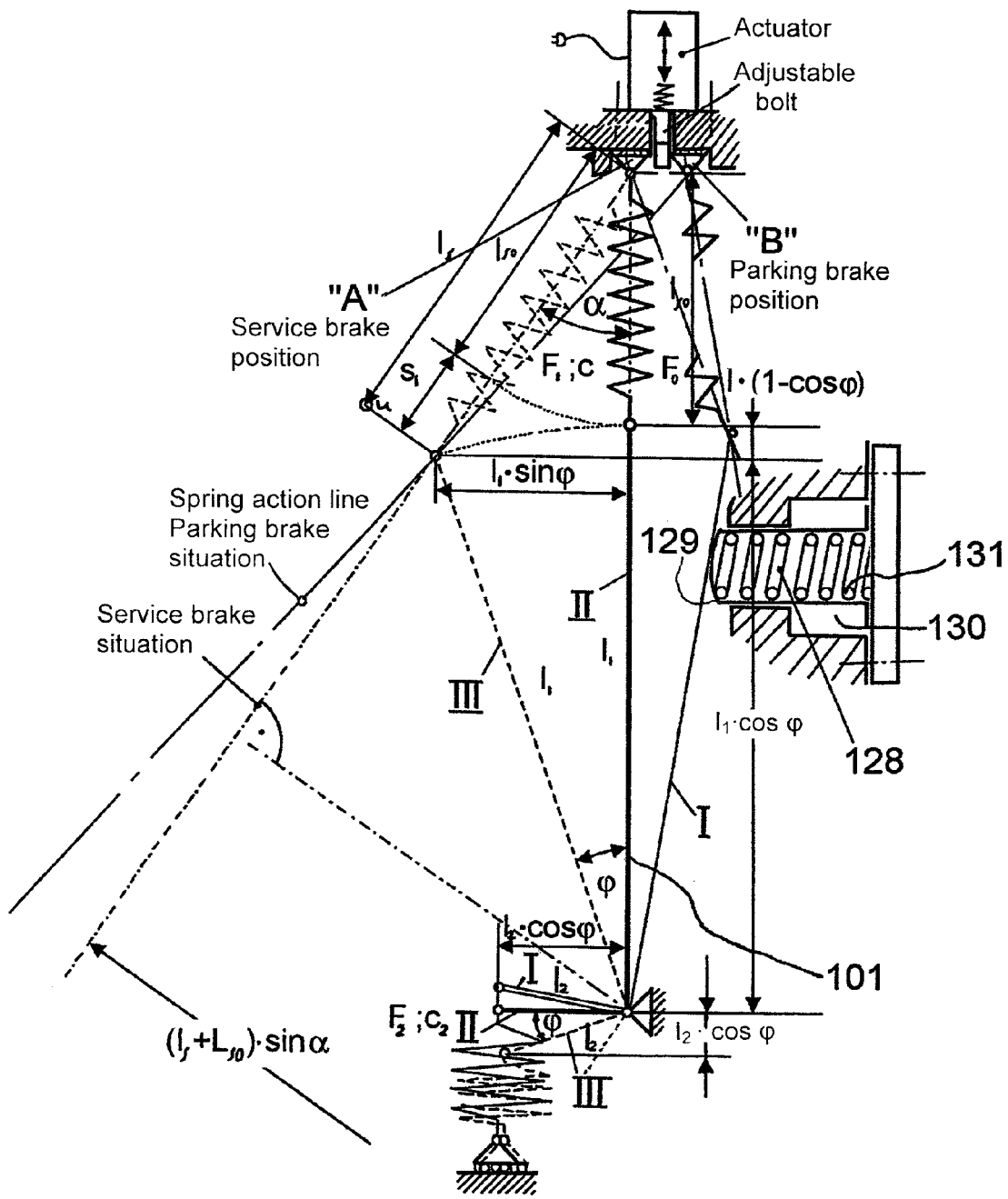
FIG. 17 shows a diagrammatic illustration of the implementation of a parking brake function with a disc brake according to the invention.

Furthermore, FIG. 17 shows two positions of the spring abutment:

"A"—Service brake position

"B"—Parking brake position.

By means of the possible combinations of lever and abutment positions, the desired operating states of the brake can be set.

The desired operating states are as follows:

Service Brake Situation:

In the case of a passive brake actuator (for example, failure of the electric drive during braking), the brake will be released automatically in order to avoid unstable driving states and to keep the vehicle operational.

Parking Brake Situation:

With the parking brake engaged, the braking action is to be maintained without actuation energy. Shrinkage processes on the brake should be compensated by an automatic adjustment.

These contrary requirements can be fulfilled by adjusting the spring abutment.

Sequence of parking brake actuation:

Engagement of the parking brake:

Actuation of the brake and pivoting of the brake lever into the braking position.

Retraction of the adjustable bolt counter to the force of the return spring by the actuator. (For example, magnetic adjuster or electromechanical linear adjuster)

Displacement of the spring abutment by the reaction force of the accumulator spring into the parking brake position "B".

The varied action direction of the accumulator spring then affords a safe excess of actuating torque of the accumulator spring against the return torque of the brake caliper.

Release of the parking brake:

Return of the brake lever into the rest position I by the brake actuator.

Pushing of the spring abutment back into the service brake position by the reaction force of the accumulator spring (if appropriate, with assistance by an additional return force, for example a return spring).

Pushing in of the bolt by the actuator.

Instead of the displaceability of the spring abutment, a pivoting mechanism may also be employed.

Measures a) to d) described may perfectly well be used in combination. The necessary actuation torque of the brake can consequently be limited to amounts below 50 Nm.

| Table of Reference Symbols | |
|---|---|
| Abutment | A |
| Lever arm | $l_1$ |
| Lever arm | $l_2$ |
| Spring rigidities | $c_1$ and $c_2$ |
| Arc marked by arrow | x |
| Energy accumulator | 1 |
| Brake caliper | 2 |

| Table of Reference Symbols -continued | |
|---|---|
| Articulation point | 3 |
| Guide piston | 4 |
| Lever arm | 5 |
| Stop | 6 |
| Accumulator spring | 101 |
| Brake caliper | 102 |
| Plate | 103 |
| Ball | 104 |
| Joint | 105 |
| Brake lever | 106 |
| Lever eccentric portion | 107 |
| Inner wall | 108 |
| Shaft | 109 |
| Pressure piece | 110 |
| Brake disc | 111 |
| Lever bearing shell | 112 |
| Adjusting spindle | 113 |
| Drive wheel | 114 |
| Return boss | 115 |
| Linear adjuster | 116 |
| Brake pad | 117 |
| Adjusting eccentric | 118 |
| Latching toothing | 119 |
| Roller or plain bearing | 120 |
| Support bearing | 121 |
| Tappet | 122 |
| Spindle/nut combination | 123 |
| Brake disc | 124 |
| Contrate wheel segment | 125 |
| Output pinion | 126 |
| Motor/gear arrangement | 127 |
| Positions | 106A and 106B |
| Sprung stop | 128 |
| Stop pot | 129 |
| Annular space | 130 |
| Stop spring | 131 |
| Collar | 132 |
| Plain bearing | 133 |
| Arrangement | 134, 135, 136, 137 |

The invention claimed is:

1. A brake device, comprising:

a brake caliper having a brake caliper housing;

an energy accumulator supported at a first end on the brake caliper housing and at a second end on an abutment within the brake caliper housing via a first lever arm pivotally connected to the second end of the energy accumulator; and a second lever arm implemented via the abutment, wherein the second lever arm via the abutment implements a mechanism for exchange of spring-elastic forces between the energy accumulator embodied as one spring element and the brake caliper embodied as another spring element, wherein the first and second lever arms variably assume at least two different angular positions relative to one another in relation to the abutment;

an articulation point at the first end of the energy accumulator on the brake caliper is variable, the articulation point at the first end of the energy accumulator is arranged to be laterally displaceable on the brake caliper housing into a parking brake position via at least one of retracting an adjustable bolt counter to a return spring force and the reaction force of the accumulator spring, and the articulation point at the first end of the energy accumulator is arranged to be laterally displaceable on the brake caliper housing into a service brake position via at least one of the reaction force of the accumulator spring and inserting the adjustable bolt via a brake actuator.

2. The brake device as claimed in claim 1, wherein a force multiplier mechanism is configured so as to automatically be in an equilibrium state in each adjustment position of the lever arms and a tension force of the brake device which is to be set.

3. The brake device as claimed in claim 2, wherein, to set a stable rest position of the force multiplier mechanism, the first lever arm is positioned a few degrees of angle before dead center.

4. The brake device as claimed in claim 3, wherein a release play of the brake can be overcome essentially even before the overshooting of dead center.

5. The brake device as claimed in claim 1, wherein the first and second lever arms are configured to assume any desired angular position in relation to one another within a predetermined maximum range with respect to the abutment.

6. The brake device as claimed in claim 5, wherein the first lever arm generating the tension force is variable in its angular position in relation to a force direction of a tension force.

7. The brake device as claimed in claim 6, wherein an angular position, leading with respect to the angular position of the second lever arm, of the first lever arm is set.

8. The brake device as claimed in claim 7, wherein the lead angle can be increased proportionally to the brake pad wear by action of a wear adjustment system in the brake device.

9. The brake device as claimed in claim 1, wherein the spring force of the accumulator spring is either compressive spring force or tensile spring force and the spring force of the brake caliper is either compressive spring force or tensile spring force.

10. The brake device as claimed in claim 1, wherein a straight guidance of the spring element which is formed by the energy accumulator is provided.

11. The brake device as claimed in claim 1, wherein a force transmission occurs from a pressure surface of a guide piston to one of the lever arms.

12. The brake device as claimed in claim 1, wherein the spring elements are tied to the lever arms in an articulated manner, so that, during a pivoting of the lever, action directions of the spring forces execute a pivoting movement.

13. The brake device as claimed in claim 1, wherein the brake device is a disc brake having a brake disc straddled by the brake caliper; and
wherein the energy accumulator is an accumulator spring arranged in the brake caliper and supported at one end via a support bearing on an interior of the brake caliper in a region facing away from the brake disc and, at another end facing the brake disc, articulated at a joint as an articulation point on a pivotable brake lever forming the first lever arm.

14. The brake device as claimed in claim 13, wherein the brake lever is supported on an inner wall of the brake caliper via a roller bearing or plain bearing.

15. The brake device as claimed in claim 14, wherein an eccentric-like end of the brake lever is part of an adjusting eccentric, which is supported on a brake caliper-supported support bearing, the adjusting eccentric acting via a shaft as a rotary mounting on at least one pressure piece which presses a brake pad in the direction of the brake disc.

16. The brake device as claimed in claim 15, wherein an adjusting device engages on the brake lever.

17. The brake device as claimed in claim 16, wherein the adjusting drive has an electromotive drive.

18. The brake device as claimed in claim 16, wherein the adjusting drive is a linear adjuster.

19. The brake device as claimed in claim 15, wherein the abutment of the brake device lies in the shaft.

20. The brake device as claimed in claim 19, wherein the eccentric-like end of the brake lever is divided into an outer lever mounting, which is combined with the support bearing for supporting the accumulator spring force in a non-actuated state of the brake, and the adjusting eccentric received inside in a half-shell mounting.

21. The brake device as claimed in claim 20, wherein the adjusting eccentric is provided at least partially on its outer circumference with a latching toothing, which is also present in complementary form on the inner circumference of a bearing shell of the lever mounting.

22. The brake device as claimed in claim 21, wherein the latching toothing is configured such that, during brake actuations, the adjusting eccentric is not rotated back, but can be adjusted in the force-free rest state of the brake lever.

23. The brake device as claimed in claim 22, wherein an adjusting spindle engages on the adjusting eccentric.

24. The brake device as claimed in claim 23, wherein the adjusting spindle is connected to an adjusting gear via a drive wheel such that the adjusting spindle moves the adjusting eccentric toward larger lead angles with increasing lining wear.

25. The brake device as claimed in claim 24, wherein a return boss is arranged on the adjusting eccentric.

26. The brake device as claimed in claim 13, wherein the brake lever is pivotable between two end positions, wherein in at least one of its end positions, the brake lever bears against a resilient stop.

27. The brake device as claimed in claim 26, wherein the resilient stop has a stop spring.

28. The brake device as claimed in claim 26, wherein the stop spring is designed as a cup spring or helical spring.

29. The brake device as claimed in claim 26, wherein the stop spring is arranged in a stop pot, which is movable between two positions in relation to the brake caliper.

30. The brake device as claimed in claim 29, wherein the stop pot has a collar, which is displaceable to a limited extent in an annular space in the brake caliper.

31. The brake device as claimed in claim 13, wherein the arrangement for displacing the articulation point of the energy accumulator on the brake caliper is designed as an adjusting spindle.

32. A method for performing a parking brake function via a disc brake according to claim 13, wherein in order to engage the parking brake, the method comprises the following acts:
a. actuating the disc brake and pivoting the brake lever into a braking position;
b. retracting an adjustable bolt counter to a return spring force; and
c. displacing a spring abutment into a parking brake position via the reaction force of the accumulator spring.

33. The method according to claim 32, wherein in order to release the parking brake, the method comprises the following acts:
a. returning the brake lever into a rest position via a brake actuator;
b. pushing the spring abutment back into a service brake position by the reaction force of the accumulator spring; and
c. pushing in the adjustable bolt via the brake actuator.

* * * * *